(12) United States Patent
Yoshinaga

(10) Patent No.: US 12,232,483 B2
(45) Date of Patent: Feb. 25, 2025

(54) ANIMAL TOILET

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 70 days.

(21) Appl. No.: 17/895,605

(22) Filed: Aug. 25, 2022

(65) Prior Publication Data

US 2022/0400647 A1 Dec. 22, 2022

Related U.S. Application Data

(63) Continuation of application No. PCT/JP2021/004242, filed on Feb. 5, 2021.

(30) Foreign Application Priority Data

Apr. 27, 2020 (JP) .................................. 2020-077982

(51) Int. Cl.
*A01K 1/00* (2006.01)
*A01K 1/01* (2006.01)

(52) U.S. Cl.
CPC .................................. *A01K 1/011* (2013.01)

(58) Field of Classification Search
CPC ..... A01K 1/0107; A01K 1/011; A01K 1/0114
USPC .......................... 119/161, 165, 166, 169, 170
See application file for complete search history.

(56) References Cited

U.S. PATENT DOCUMENTS

| | | | | |
|---|---|---|---|---|
| 4,250,834 A | * | 2/1981 | Cheselka | A01K 1/0107 119/169 |
| 5,701,845 A | * | 12/1997 | Jablonski | A01K 1/0114 119/165 |
| 2004/0261727 A1 | * | 12/2004 | Matsuo | A01K 1/0107 119/170 |
| 2006/0288948 A1 | | 12/2006 | Ikegami et al. | |
| 2009/0000558 A1 | | 1/2009 | Matsuo et al. | |
| 2016/0135420 A1 | | 5/2016 | Takagi et al. | |

FOREIGN PATENT DOCUMENTS

| | | |
|---|---|---|
| CN | 1640246 A | 7/2005 |
| CN | 108347902 A | 7/2018 |
| JP | H06-75151 U | 10/1994 |

(Continued)

OTHER PUBLICATIONS

Oct. 14, 2020 Written Opinion issued in International Patent Application No. PCT/JP2020/029869.

(Continued)

*Primary Examiner* — Peter M Poon
*Assistant Examiner* — Danielle A Clerkley
(74) *Attorney, Agent, or Firm* — Oliff PLC

(57) ABSTRACT

An animal toilet includes a body portion, and a partition portion. The body portion has a bottom face part and a side face part, and is in a box shape. The partition portion is in a plate shape, and divides the inside of the body portion vertically. The partition portion has a through hole that allows urine to pass therethrough. The thickness of the partition portion in a surrounding part around the through hole is smaller than the thickness of the partition portion in a remaining part that is the part other than the surrounding part. The surrounding part around the through hole inclines downward toward the through hole.

19 Claims, 12 Drawing Sheets

(56) References Cited

FOREIGN PATENT DOCUMENTS

| | | |
|---|---|---|
| JP | 2007-174918 A | 7/2007 |
| JP | 2014-195430 A | 10/2014 |
| JP | 2014-195776 A | 10/2014 |
| JP | 2015-204799 A | 11/2015 |
| JP | 2016-041038 A | 3/2016 |
| JP | 2019-146549 A | 9/2019 |
| KR | 20-0461110 Y1 | 6/2012 |
| KR | 10-2017-0053050 A | 5/2017 |
| WO | 2019/167191 A1 | 9/2019 |

OTHER PUBLICATIONS

U.S. Appl. No. 17/684,501, filed Mar. 2, 2022 in the name of Junji Yoshinaga.
Nov. 22, 2023 Office Action issued in U.S. Appl. No. 17/684,501.
Feb. 28, 2024 Office Action issued in U.S. Appl. No. 17/684,501.
May 16, 2024 Office Action issued in Chinese Patent Application No. 202180007281.1.
Aug. 14, 2024 Office Action issued in U.S. Appl. No. 17/684,501.
Apr. 27, 2021 Search Report issued in International Patent Application No. PCT/JP2021/004242.
Apr. 27, 2021 Written Opinion of the International Searching Authority issued in International Patent Application No. PCT/JP2021/004242.
Dec. 17, 2024 Office Action issued in U.S. Appl. No. 17/684,501.

* cited by examiner

ANIMAL TOILET

CROSS REFERENCE TO RELATED APPLICATION

This is a Continuation of International Application No. PCT/JP2021/004242 filed Feb. 5, 2021, which claims the benefit of Japanese Application No. 2020-077982 filed Apr. 27, 2020. The contents of these applications are hereby incorporated by reference in their entirety.

TECHNICAL FIELD

The present invention relates to an animal toilet.

BACKGROUND ART

A conventional animal toilet is disclosed in, for example, Patent Document 1. The animal toilet disclosed in Patent Document 1 includes a box-shaped body portion (container), and a plate-shaped partition portion. Through holes that allow urine to pass therethrough are formed in the partition portion. The internal space of the body portion is divided into an upper space and a lower space by the partition portion. A plurality of non-absorptive grains are laid in the upper space (on the partition portion). An excrement treatment material that absorbs urine is laid in the lower space.

CITATION LIST

Patent Document

Patent Document 1: JP 2016-41038 A

SUMMARY OF INVENTION

Technical Problem

In the animal toilet described above, urine excreted on the grains moves from the upper space to the lower space via the through holes of the partition portion after passing through gaps between the grains. However, in the conventional animal toilet, there has been a problem that the through holes are blocked by urine that adheres to the inner surface of the through holes by the surface tension. If the through holes are blocked in that way, urine is prevented from moving smoothly from the upper space to the lower space.

Solution to Problem

The present invention has been made in view of the above-described problem, and it is an object thereof to provide an animal toilet in which a through hole is unlikely to be blocked by urine.

An animal toilet according to the present invention includes: a box-shaped body portion that has a bottom face part and a side face part; and a plate-shaped partition portion that has a through hole allowing urine to pass therethrough, and divides an inside of the body portion vertically. A first thickness that is a thickness of the partition portion in a surrounding part around the through hole is smaller than a second thickness that is a thickness of the partition portion in a remaining part, the remaining part being a part other than the surrounding part. The surrounding part inclines downward toward the through hole.

In this animal toilet, the thickness (first thickness) of the partition portion in the surrounding part around the through hole is smaller than the thickness (second thickness) of the partition portion in the part other than the surrounding part (remaining part). By thinning the partition portion in the surrounding part around the through hole in this way, the length of the through hole can be reduced. Thus, the through hole becomes less likely to be blocked by urine, because urine adhering to the inner surface of the through hole by the surface tension decreases.

Advantageous Effects of Invention

According to the present invention, it is possible to implement an animal toilet in which a through hole is unlikely to be blocked by urine.

DESCRIPTION OF EMBODIMENTS

Figure 1:
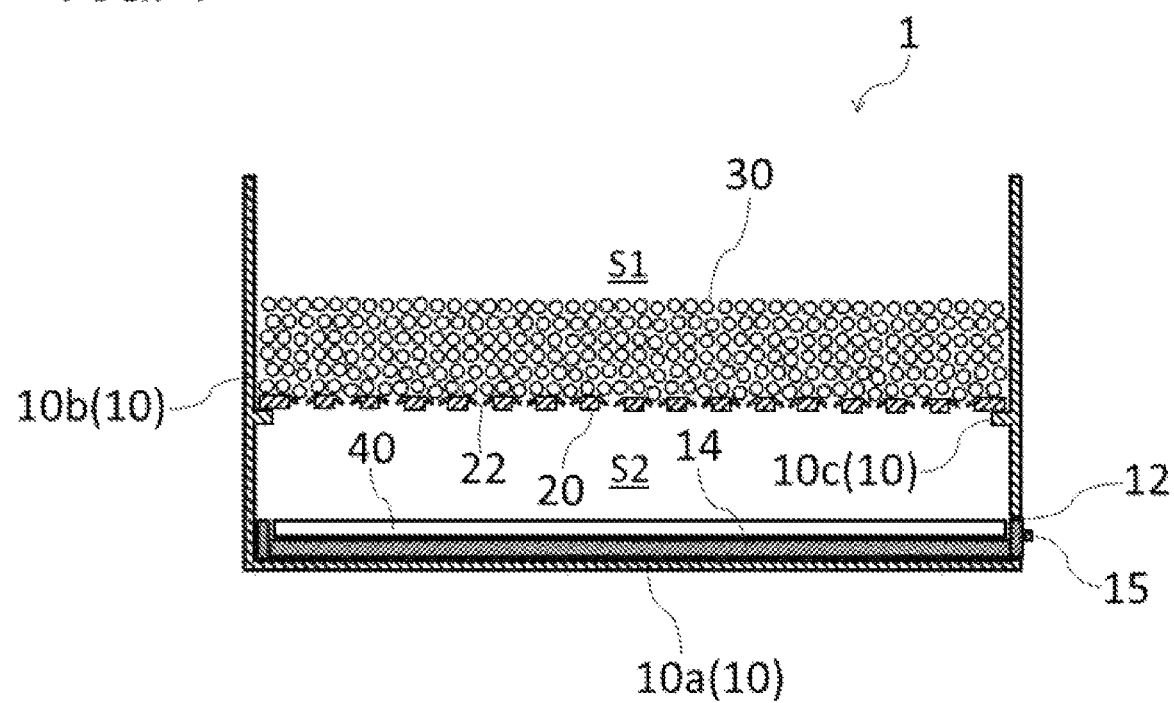
FIG. 1 is an end view showing an embodiment of an animal toilet according to the present invention.

Hereinafter, an embodiment of the present invention will be described in detail with reference to the drawings. In the description of the drawings, the same elements are given the same reference numerals, and a redundant description will be omitted.

FIG. 1 is an end view showing an embodiment of an animal toilet according to the present invention. An animal toilet 1 includes a body portion 10, a drawer portion 14, a partition portion 20, a plurality of grains 30, and a water-absorbing sheet 40. The body portion 10 has a bottom face part 10a and a side face part 10b, and is in a box shape. In the present embodiment, the body portion 10 is in an approximately rectangular parallelepiped shape. As a material of the body portion 10, for example, plastic such as polypropylene or polyethylene can be used.

The body portion 10 has a projecting part 10c that is provided so as to project from the side face part 10b toward the inside of the body portion 10. The projecting part 10c may be a projection or a projected rim. The projecting part 10c may be formed integrally with the side face part 10b, or may be attached to the side face part 10b after being formed separately from the side face part 10b. The projection length of the projecting part 10c (the length in the direction perpendicular to the inner surface of the side face part 10b provided with the projecting part 10c) is, for example, between 5 mm and 15 mm inclusive.

The drawer portion 14 is capable of being inserted in and extracted from the body portion 10 through an opening 12 formed in the side face part 10b. The drawer portion 14 houses the water-absorbing sheet 40. As a material of the drawer portion 14, for example, plastic such as polypropylene or polyethylene can be used.

The partition portion 20 is placed on the projecting part 10c. The partition portion 20 is in a plate shape, and arranged in parallel with the bottom face part 10a. The partition portion 20 is provided at a position apart from both the water-absorbing sheet 40 and the upper end of the body portion 10. Thus, the partition portion 20 divides the inside of the body portion 10 vertically. That is, the internal space of the body portion 10 is divided into an upper space S1 and a lower space S2 by the partition portion 20. The partition portion 20 is detachable relative to the body portion 10. The partition portion 20 has a through hole 22 that allows urine to pass through the through hole 22. As a material of the partition portion 20, for example, plastic such as polypropylene or polyethylene can be used.

The plurality of grains 30 are disposed in the body portion 10. In the descriptions below, "plurality of grains 30" refers to all of the grains 30 disposed in the body portion 10 unless otherwise indicated. The plurality of grains 30 are disposed in the body portion 10 in a state of being laid on the partition portion 20. When the animal toilet 1 is used, the grains 30 directly receive excreted urine. The grains 30 have a water-repellent property. That is, the grains 30 have the property of not absorbing liquid such as urine at all, or hardly absorbing it.

The grains 30 having the water-repellent property require the water-repellent rate of 80% or more measured by the following test. First, approximate 50 grams of a plurality of the grains 30 (sample) are placed in a strainer. An empty beaker is set under the strainer. Then, 30 ml of water is dripped on the sample over 10 seconds using a syringe without a needle. After waiting 1 minute, the quantity of the water in the beaker is measured. The ratio of the measured water quantity with respect to the quantity of the dripped water (30 ml) shall be the water-repellent rate. That is, if the water quantity in the beaker is 24 ml or more, the water-repellent rate is 80% or more, and therefore the grains 30 are found to have the water-repellent property. For reference, the water-repellent rate of general water-absorbing cat litter, which is commercially available, is about 5%.

The grains 30 are each formed in a granular shape. Examples of the granular shape include a sphere, column, and ellipsoid. The particle diameter of the grain 30 is, for example, between 5 mm and 15 mm inclusive. As used herein, the particle diameter is defined as the diameter of the minimum sphere that can include the grain 30. The grain 30 preferably contains an organic substance as its main material. As used herein, the main material refers to the material that accounts for the highest weight ratio in the grain 30, out of one or more materials constituting the grain 30. As the organic substance, for example, papers, used tea leaves, plastics, or bean curd lees can be used.

The papers refer to a material composed mainly of pulp. Examples of the papers include, in addition to ordinary paper, a vinyl chloride wallpaper classified product (paper obtained by classifying vinyl chloride wallpaper), fluff pulp, papermaking sludge, and pulp sludge. As the plastics, for example, a disposable diaper classified product (plastic obtained by classifying disposable diapers) may be used. The bean curd lees are preferably dried bean curd lees. These materials may be subjected to water repellency treatment.

The material(s) constituting the grain 30 may be only one material, or two or more materials. In the former case, the main material described above is the only material constituting the grain 30. In the latter case, the grain 30 is made of a mixture of the main material and other material(s). Gypsum is an example of the other material. Adding gypsum can enhance the water-repellent property of the grain 30. The quantity of gypsum is, for example, between 5 wt. % and 15 wt. % inclusive with respect to the entirety of the grain 30.

The grains 30 can be manufactured by, for example, the following method. First, granules that will serve as the grains 30 are formed by granulating a granulating material (the material(s) constituting the grains 30) with a granulation apparatus. As the granulation apparatus, for example, an extrusion granulator can be used. The granules may be subjected to water repellency treatment as needed. The water repellency treatment can be performed by, for example, coating the surfaces of the granules with a water repellent agent. In the case where the water repellency treatment is not performed, it is preferable that crevices are prevented from forming in the granules as much as possible by increasing the pressure that is applied to the granulating material during granulation. This is because the crevices serve as a path through which moisture such as urine enters inside the grains 30. Prior to the granulation, pretreatment such as pulverization, kneading, and adding water is performed on the granulating material as needed. Also, after granulation, posttreatment such as sieving (sizing), and drying is performed as needed.

The water-absorbing sheet 40 is disposed under the partition portion 20. In the present embodiment, the water-absorbing sheet 40 is disposed in the body portion 10 in a state of being housed in the drawer portion 14. The water-absorbing sheet 40 absorbs urine that has passed through the through hole 22 of the partition portion 20.

When the animal toilet 1 is used, urine excreted on the grains 30 flows downward while winding its way through gaps between the adjacent grains 30. The urine moves from the upper space S1 to the lower space S2 via the through hole 22 of the partition portion 20, and then is absorbed by the water absorbing sheet 40.

Figure 2:
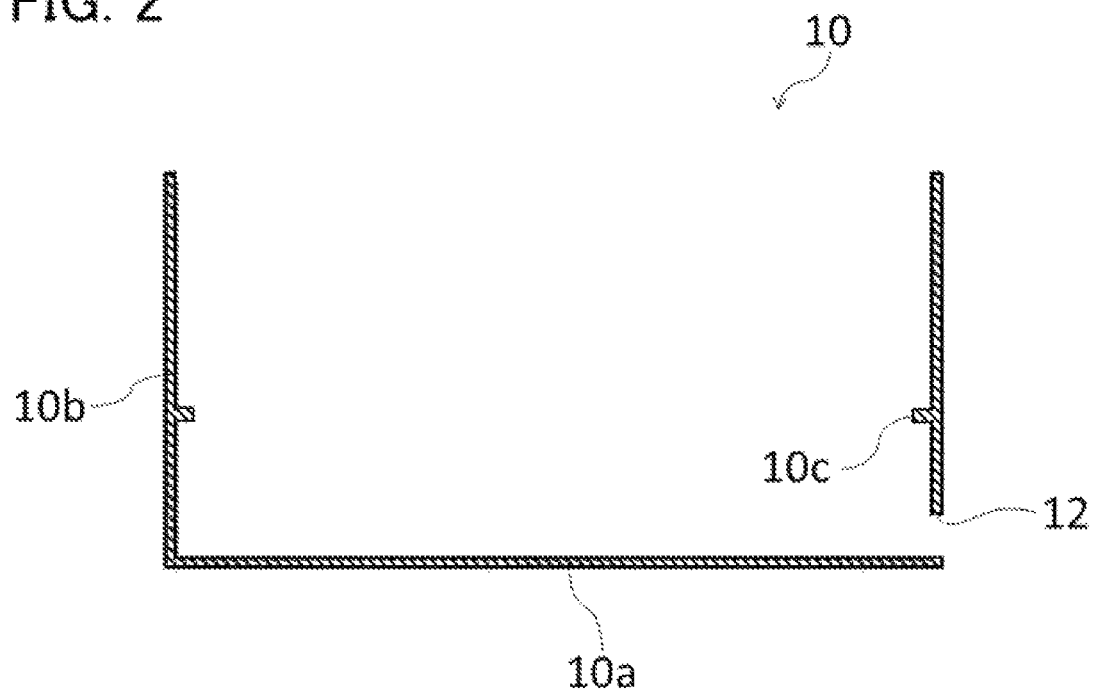
FIG. 2 is an end view showing a body portion 10.
Figure 3:
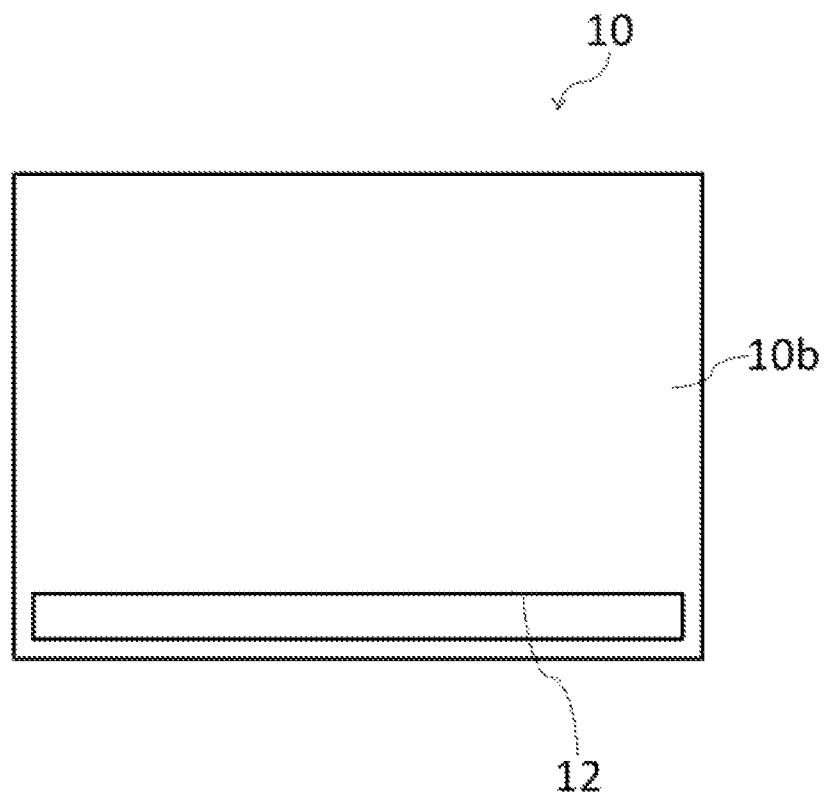
FIG. 3 is a front view showing the body portion 10.
Figure 4:
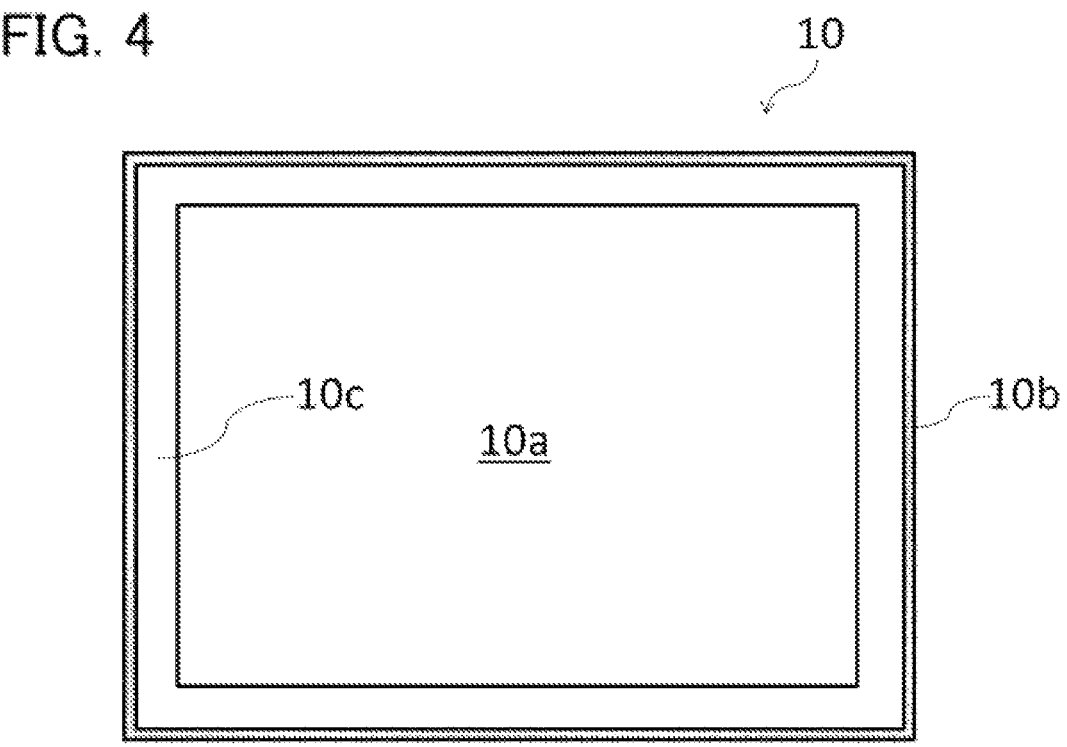
FIG. 4 is a plan view showing the body portion 10.

Hereinafter, referring to FIG. 2 to FIG. 7, the constitution of each portion of the animal toilet 1 will be described in detail. FIG. 2, FIG. 3 and FIG. 4 are, respectively, an end view, a front view and a plan view showing the body portion 10. As shown in FIG. 2 and FIG. 3, the opening 12 for inserting and extracting the drawer portion 14 is formed in the side face part 10b of the body portion 10. The opening 12 is located near the bottom face part 10a, and in a horizontally long rectangular shape. The length in the horizontal direction (right/left direction in FIG. 3) of the opening 12 is nearly equal to the breadth of the inside of the body portion 10, and is, for example, between 20 cm and 40 cm inclusive. The length in the vertical direction (top/bottom direction in FIG. 3) of the opening 12 is, for example, between 2 cm and 5 cm inclusive. Also, as shown in FIG. 4, the projecting part 10c is composed of a projected rim that is provided annularly over the entirety of the inner surface of the side face part 10b in plan view in the present embodiment.

Figure 5:
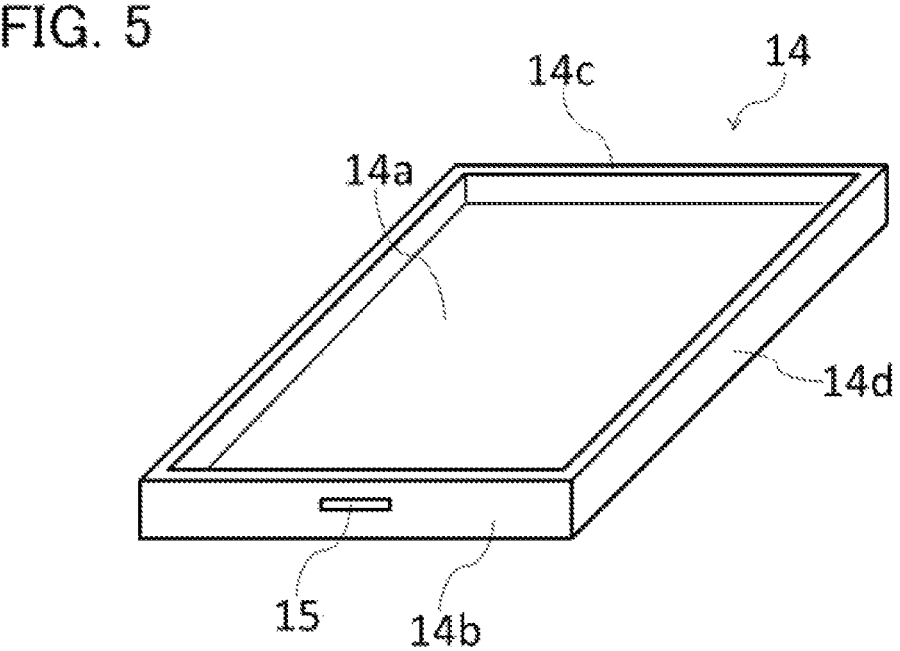
FIG. 5 is a perspective view showing a drawer portion 14.

FIG. 5 is a perspective view showing the drawer portion 14. The drawer portion 14 has a bottom board 14a, a front board 14b, a rear board 14c, and a pair of side boards 14d. The size of the bottom board 14a is nearly equal to the size of the bottom face part 10a of the body portion 10. The front board 14b has nearly the same shape and size as the opening 12. A grip 15 is attached to the front board 14b.

Figure 6:
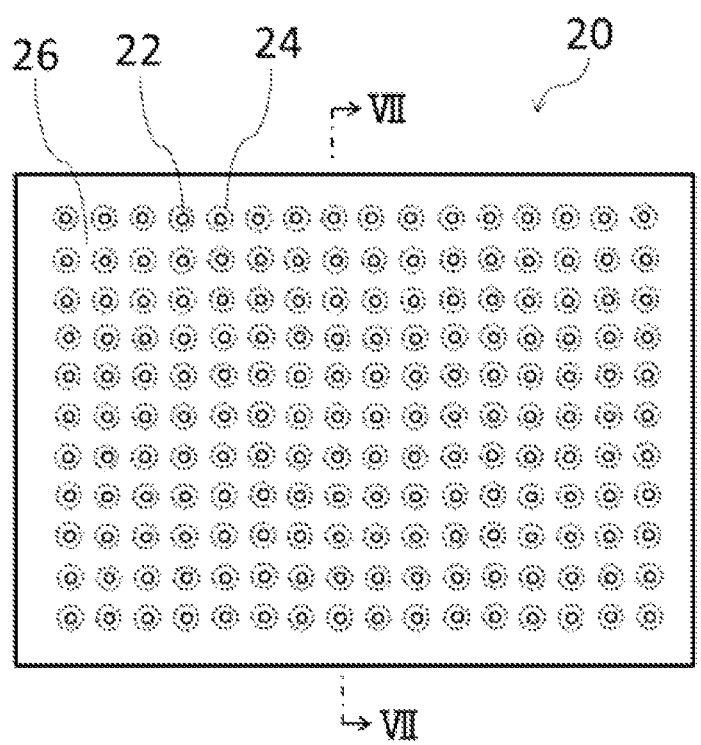
FIG. 6 is a plan view showing a partition portion 20.
Figure 7:
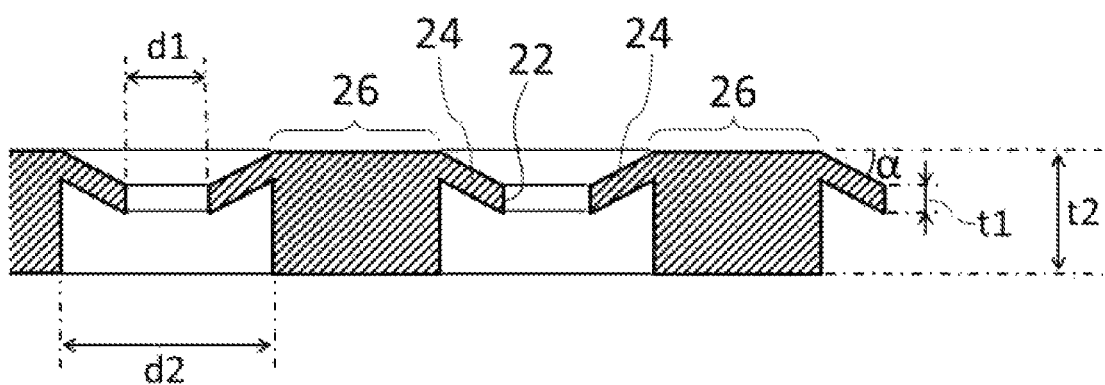
FIG. 7 is a cross-sectional view showing a part of the cross section taken along line VII-VII in FIG. 6.

FIG. 6 is a plan view showing the partition portion 20. Also, FIG. 7 is a cross-sectional view showing a part of the cross section taken along line VII-VII in FIG. 6. A plurality of the through holes 22 are formed in the partition portion 20. The plurality of through holes 22 are arranged two-dimensionally in the partition portion 20. In the present embodiment, the plan shape of each of the through holes 22 is circular. The through holes 22 allow urine to pass therethrough. However, the through holes 22 do not allow the grain 30 to pass therethrough. That is, the through holes 22 each have such a size and shape that urine can pass through the through hole 22 whereas the grain 30 cannot pass through the through hole 22.

The thickness t1 (first thickness) of the partition portion 20 in a surrounding part 24 around the through hole 22 is smaller than the thickness t2 (second thickness) of the partition portion 20 in a remaining part 26 that is the part other than the surrounding part 24. The thickness t1 is preferably half or less of the thickness t2, and more preferably a quarter or less of the thickness t2. The thickness t1 is equal to the minimum thickness of the partition portion 20. That is, the thickness of the partition portion 20 takes the minimum value in the surrounding part 24. Also, the thickness t2 is equal to the maximum thickness of the partition portion 20. That is, the thickness of the partition portion 20 takes the maximum value in the remaining part 26. The thickness t1 is, for example, between 1 mm and 3 mm inclusive. Also, the thickness t2 is, for example, between 5 mm and 10 mm inclusive.

As can be seen from FIG. 7, the surrounding part 24 inclines downward toward the through hole 22. In the present embodiment, the entirety of the surrounding part 24 inclines. The upper surface and the lower surface of the surrounding part 24 are parallel to each other. Although the surrounding part 24 inclines in this way, its thickness t1 shall be defined as the length in the vertical direction (the direction that is perpendicular to the upper surface and the lower surface of the remaining part 26). The inclination angle α of the surrounding part 24 is preferably between 10° and 50° inclusive, and more preferably between 20° and 40° inclusive.

In the present embodiment, the entirety of the part of the partition portion 20 other than the through holes 22 has the thickness t1 or the thickness t2. In other words, the thickness of the partition portion 20 takes a constant value (t1) over the entirety of the surrounding part 24, and another constant value (t2) over the entirety of the remaining part 26. The partition portion 20 has the thickness t2 at the midpoint of adjacent two of the through holes 22. As used herein, the midpoint refers to the middle point of the line segment connecting the centers of the two through holes 22 in plan view. Also, the upper surface of the surrounding part 24 is continuous with the upper surface of the remaining part 26.

The surrounding part 24 is an annular region that surrounds the through hole 22 in plan view. In FIG. 6, the outline (outer contour) of the surrounding part 24 is shown by a dotted line. The shape of the through hole 22 and the shape of the outline of the surrounding part 24 are similar to each other in plan view. The outer diameter d2 of the surrounding part 24 is larger than the particle diameter of one of the plurality of grains 30 that has the minimum particle diameter. The outer diameter d2 of the surrounding part 24 is preferably 1.5 times or more of the diameter d1 of the through hole 22, and more preferably 2 times or more of the diameter d1. The area of the entire remaining part 26 is larger than the area of the entire surrounding parts 24 in plan view.

The diameter d1 of the through hole 22 is constant with respect to the thickness direction (top/bottom direction in FIG. 7) of the partition portion 20. Therefore, the inner surface of the through hole 22 is in a cylindrical shape. The diameter d1 is smaller than the particle diameter of one of the plurality of grains 30 that has the minimum particle diameter. The diameter d1 is, for example, between 2 mm and 4 mm inclusive. The length of the through hole 22 is equal to the thickness t1 of the surrounding part 24.

The effects of the animal toilet 1 will be described. In the animal toilet 1, the thickness t1 of the partition portion 20 in the surrounding part 24 around the through hole 22 is smaller than the thickness t2 of the partition portion 20 in the part other than the surrounding part 24 (the remaining part 26). By thinning the partition portion 20 in the surrounding part 24 around the through hole 22 in this way, the length of the through hole 22 can be reduced. Thus, the through hole 22 becomes less likely to be blocked by urine, because urine adhering to the inner surface of the through hole 22 by the surface tension decreases. Accordingly, the animal toilet 1 in which the through hole 22 is unlikely to be blocked by urine is implemented.

Figure 8:
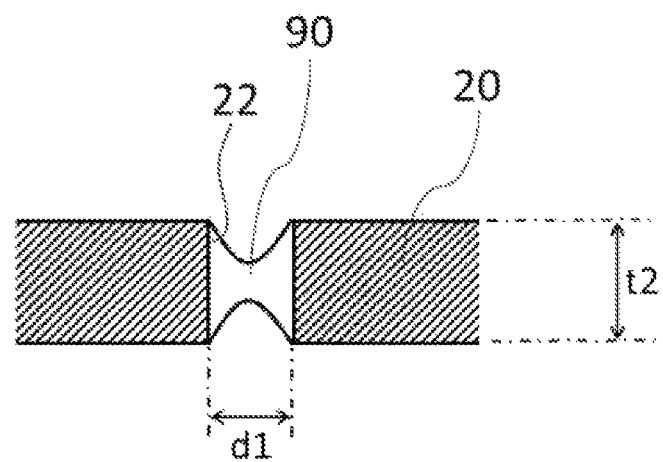
FIG. 8 is an end view for illustrating an effect of the animal toilet in FIG. 1.

In contrast, as shown in FIG. 8, in a case where the thickness of the partition portion 20 is uniform (a case where the thickness of the surrounding part around the through hole 22 is equal to the thickness t2 of the remaining part), urine 90 adhering to the inner surface of the through hole 22 by the surface tension increases due to the length of the through hole 22 being large. Then, the through hole 22 becomes more likely to be blocked by the urine 90. In this regard, according to the animal toilet 1, it is possible to reduce the length of the through hole 22 as described above, and thereby make the urine 90 adhering to the inner surface of the through hole 22 by the surface tension decrease (see FIG. 9).

Incidentally, enlarging the diameter d1 of the through hole 22 can also be considered as a means for making the through hole 22 unlikely to be blocked by the urine adhering to the inner surface of the through hole 22. However, there is a constraint that the diameter d1 of the through hole 22 should have such a size that the grain 30 cannot pass through the through hole 22. Even though the diameter d1 is enlarged under the constraint, an effect enough to make the through hole 22 unlikely to be blocked cannot be obtained. In this regard, the animal toilet 1 adopts the means of thinning the surrounding part 24 to reduce the length of the through hole 22. According to this means, the length of the through hole 22 can be reduced irrelevantly to the above-described constraint, and therefore it is possible to obtain an effect enough to make the through hole 22 unlikely to be blocked.

On the other hand, making the thickness t2 of the remaining part 26 larger than the thickness t1 of the surrounding part 24 is advantageous for securing strength of the partition portion 20, compared to the case where the entirety of the partition portion 20 is thinned (the case where the entirety of the partition portion 20 has the thickness t1). Since an animal excretes in a state of directly getting on the grains 30 in the animal toilet 1, the partition portion 20 is required to have sufficient strength.

Furthermore, the surrounding part 24 inclines downward toward the through hole 22 in the present embodiment. Thus, urine is unlikely to remain on the upper surface of the surrounding part 24, and therefore the urine is easily guided to the through hole 22. For this reason, the urine can move smoothly from the upper space S1 to the lower space S2. Moreover, in this case, a pocket P1 (a part with the dot pattern in FIG. 9) is generated between the lower surface of the surrounding part 24 and the side surface 26a of the remaining part 26. Even in a case where a malodor is generated from urine accumulating in the lower space S2

(including urine absorbed by the water-absorbing sheet 40), the odor can be caught in the pocket P1. Thus, the odor is restrained from leaking from the lower space S2 to the upper space S1 via the through hole 22.

Making the inclination angle α of the surrounding part 24 large is advantageous for enhancing the effect of preventing urine from remaining on the upper surface of the surrounding part 24 and the effect of catching odors in the pocket P1. From this viewpoint, the a is preferably 10° or more, and more preferably 20° or more. On the other hand, if the a is too large, there is an adverse effect that dirt or the like is likely to accumulate in the upper end part of the pocket P1 due to the upper end part becoming sharp. From this viewpoint, the a is preferably 50° or less, and more preferably 40° or less.

In the case where the partition portion 20 is made of plastic, it is necessary for the partition portion 20 to have a certain degree of thickness in order to sufficiently secure strength of the partition portion 20. Therefore, the animal toilet 1 is particularly useful, since the animal toilet 1 includes the partition portion 20 in which only the surrounding part 24 is thinned, leaving the remaining part 26.

The smaller the thickness t1 of the surrounding part 24 becomes, the smaller the length of the through hole 22 becomes. From this viewpoint, the thickness t1 is preferably half or less of the thickness t2 of the remaining part 26, and more preferably a quarter or less of the thickness t2. On the other hand, if the thickness t1 is too small, the partition portion 20 is likely to be damaged in the surrounding part 24. From this viewpoint, the thickness t1 is preferably one-tenth or more of the thickness t2.

The thickness t1 of the surrounding part 24 is equal to the minimum thickness of the partition portion 20. Reducing the thickness t1 as much as possible in this way is advantageous for making urine adhering to the inner surface of the through hole 22 decrease.

The thickness t2 of the remaining part 26 is equal to the maximum thickness of the partition portion 20. Increasing the thickness t2 as much as possible in this way is advantageous for enhancing strength of the partition portion 20.

Figure 9:
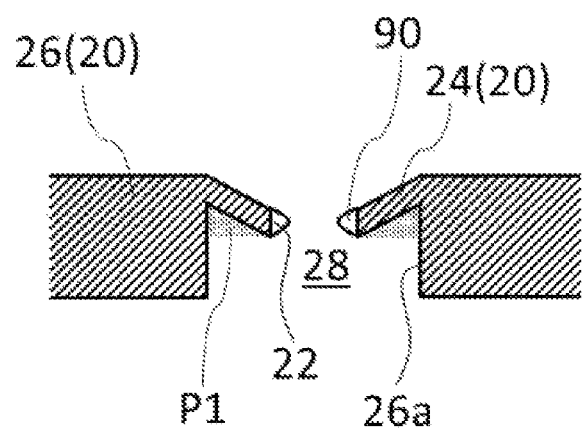
FIG. 9 is another end view for illustrating the effect of the animal toilet in FIG. 1.

A space 28 is present under the through hole 22, the space 28 being surrounded by the side surface 26a of the remaining part 26 and communicating with the through hole 22 (see FIG. 9). In order to avoid a situation in which the space 28 is blocked by urine adhering to the side surface 26a by the surface tension, it is advantageous to enlarge the outer diameter d2 of the surrounding part 24. From this viewpoint, the outer diameter d2 is preferably 1.5 times or more of the diameter d1 of the through hole 22, and more preferably 2 times or more of the diameter d1. On the other hand, if the outer diameter d2 of the surrounding part 24 that has been thinned is too large, strength of the partition portion 20 is likely to be insufficient. From this viewpoint, the outer diameter d2 is preferably 3 times or less of the diameter d1 of the through hole 22.

The outer diameter d2 of the surrounding part 24 is larger than the particle diameter of one of the plurality of grains 30 that has the minimum particle diameter. This is also advantageous for preventing the space 28 from being blocked by urine. There is not a constraint that the outer diameter d2 of the surrounding part 24 should have such a size that does not allow the grain 30 to pass therethrough, unlike the diameter d1 of the through hole 22. Therefore, the outer diameter d2 of the surrounding part 24 can be sufficiently enlarged so that the space 28 will not be blocked.

The shape of the through hole 22 and the shape of the outline of the surrounding part 24 are similar to each other in plan view. Thus, the appearance of the partition portion 20 can be enhanced. Moreover, the structure of the partition portion 20 as a whole becomes simpler, and therefore the partition portion 20 is easy to form.

The area of the remaining part 26 is larger than the area of the surrounding parts 24 in plan view. Making the area of the remaining part 26 having the relatively large thickness larger than the area of the surrounding parts 24 having the relatively small thickness in this way is advantageous for enhancing strength of the partition portion 20.

The entirety of the part of the partition portion 20 other than the through holes 22 has the thickness t1 or the thickness t2. In this case, the part of the partition portion 20 other than the through holes 22 is composed only of the part having the thickness t1 (the surrounding part 24) and the part having the thickness t2 (the remaining part 26). Thus, the structure of the partition portion 20 as a whole becomes simpler, and therefore the partition portion 20 is easy to form.

The inside of the body portion 10 is divided vertically by the partition portion 20, and the plurality of grains 30 are disposed on the partition portion 20. Thus, it is possible to separate the space (upper space S1) in which the grains 30 are disposed and the space (lower space S2) in which urine accumulates. For this reason, the grains 30 can be prevented from coming in contact with urine accumulating in the lower space S2.

The upper surface of the surrounding part 24 is continuous with the upper surface of the remaining part 26. For this reason, the space 28 is present only below the through hole 22. In this case, urine becomes less likely to adhere to the side surface 26a of the remaining part 26, because the surrounding part 24 protrudes like eaves above the space 28 (see FIG. 9). Thus, the space 28 can be effectively prevented from being blocked by urine.

The partition portion 20 has the thickness t2 at the midpoint of adjacent two of the through holes 22. Making the thickness of the midpoint of adjacent two of the through holes 22 relatively large in this way is advantageous for securing strength of the partition portion 20.

The partition portion 20 is placed on the projecting part 10c. Thus, the partition portion 20 can be disposed detachably relative to the body portion 10 with simple structure. The detachable partition portion 20 makes it possible to wash the body portion 10 and the partition portion 20 separately in a state in which the partition portion 20 has been detached from the body portion 10, and therefore the animal toilet 1 becomes easier to clean.

The water-absorbing sheet 40 is disposed under the partition portion 20. Thus, urine accumulating in the body portion 10 can be confined in the water-absorbing sheet 40. For this reason, it is possible to ease generation of malodors caused by the urine accumulating in the body portion 10.

The toilet 1 is provided with the drawer portion 14 that is capable of being inserted in and extracted from the body portion 10. Thus, used water-absorbing sheet 40 can be easily replaced with a new one.

Figure 10:
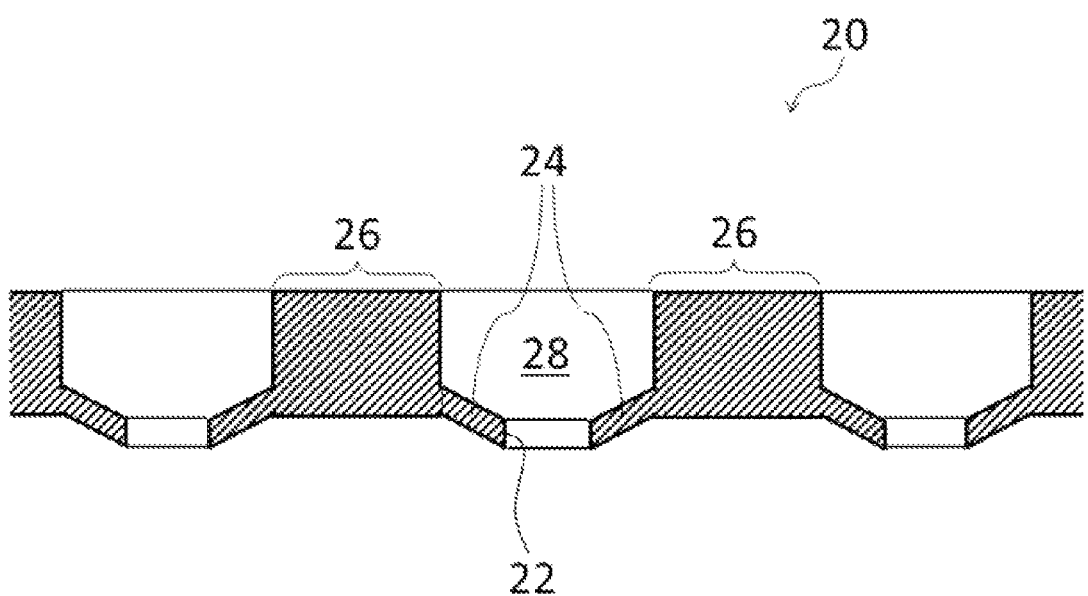
FIG. 10 is a cross-sectional view for illustrating a modified example of the partition portion 20.
Figure 11:
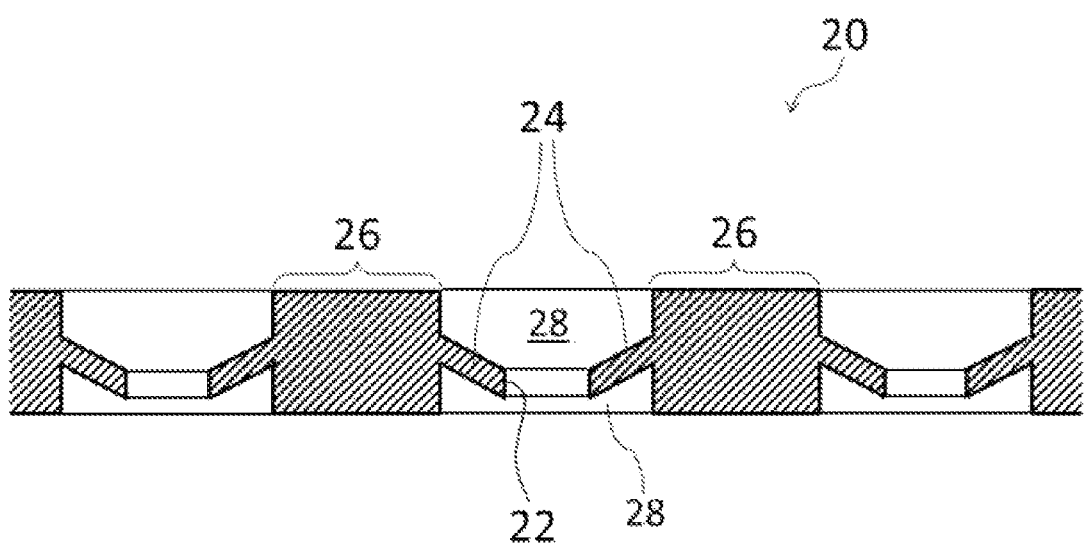
FIG. 11 is a cross-sectional view for illustrating another modified example of the partition portion 20.

The present invention is not limited to the above-described embodiment, and various modifications can be made. In the above-described embodiment, an example is given in which the upper surface of the surrounding part 24 is continuous with the upper surface of the remaining part 26. However, the upper surface of the surrounding part 24 and the upper surface of the remaining part 26 may not be continuous with each other as shown in FIG. 10 and FIG. 11. In FIG. 10, the lower surface of the surrounding part 24 and the lower surface of the remaining part 26 are continuous with each other. Also, in FIG. 11, the upper surface of the surrounding part 24 and the upper surface of the remaining part 26 are not continuous with each other, and the lower surface of the surrounding part 24 and the lower surface of the remaining part 26 are not continuous with each other. In the case where the upper surface of the surrounding part 24 and the upper surface of the remaining part 26 are not continuous with each other, at least a part of the space 28 communicating with the through hole 22 is present above the through hole 22. When the space 28 that has a larger opening than the through hole 22 is present above the through hole 22 in this way, urine is unlikely to remain on the upper surface of the remaining part 26, and therefore the urine is easily guided to the through hole 22. Thus, the urine can move smoothly from the upper space S1 to the lower space S2.

Figure 12:
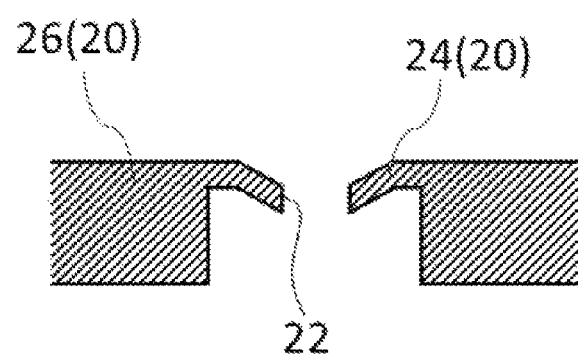
FIG. 12 is an end view for illustrating another modified example of the partition portion 20.

In the above-described embodiment, an example is given in which the entirely of the surrounding part 24 inclines. However, only a part of the surrounding part 24 may incline as shown in FIG. 12. In FIG. 12, only a part of the surrounding part 24 including the tip of the surrounding part 24 inclines downward toward the through hole 22, and the other part of the surrounding part 24 does not incline and is horizontal.

In the above-described embodiment, an example is given in which the plan shape of the through hole 22 is a circle. However, the plan shape of the through hole 22 is arbitrary, and may be, for example, a polygon such as a rectangle, or an ellipse. In the case where the plan shape of the through hole 22 is not a circle, the diameter d1 of the through hole 22 is defined as the diameter of the minimum circle that can include the through hole 22 in plan view. The same shall apply to the plan shape of the outline of the surrounding part 24. The plan shape of the through hole 22 and the plan shape of the outline of the surrounding part 24 may not be the same as each other (namely similar), and may be different from each other.

In the above-described embodiment, an example is given in which the partition portion 20 is composed of an independent member, namely the partition portion 20 constitutes the entirety of one independent member. However, the partition portion 20 may be composed of a part of an independent member, namely the partition portion 20 may constitute a part of one independent member. For example, the partition portion 20 may be composed of the bottom part of a box-shaped member.

In the above-described embodiment, an example is given in which the drawer portion 14 is provided. However, it is not essential to provide the drawer portion 14. In the case where the drawer portion 14 is not provided, the water-absorbing sheet 40 is disposed directly on the bottom face part 10a. In that case, the side face part 10b is not provided with the opening 12 naturally.

In the above-described embodiment, an example is given in which the water-absorbing sheet 40 is disposed in the body portion 10. However, it is not essential to dispose the water-absorbing sheet 40 in the body portion 10. In the case where the water-absorbing sheet 40 is not disposed, the drawer portion 14 is also not provided.

LIST OF REFERENCE NUMERALS

1 Animal Toilet
10 Body Portion
10a Bottom Face Part
10b Side Face Part
10c Projecting Part
12 Opening
14 Drawer Portion
15 Grip
20 Partition Portion
22 Through Hole
24 Surrounding Part
26 Remaining Part
26a Side Surface
28 Space
30 Grain
40 Water-Absorbing Sheet
90 Urine
P1 Pocket
S1 Upper Space
S2 Lower Space

The invention claimed is:

1. An animal toilet comprising:
a box-shaped body portion that has a bottom face part and a side face part; and
a plate-shaped partition portion that has a through hole allowing urine to pass therethrough, and divides an inside of the body portion vertically, an inner surface of the through hole being in a cylindrical shape, wherein:
a first thickness that is a thickness of the partition portion in a surrounding part around the through hole is smaller than a second thickness that is a thickness of the partition portion in a remaining part, the remaining part being a part other than the surrounding part and surrounding the surrounding part,
an upper surface and a lower surface of the surrounding part are parallel to each other, each of the upper surface and the lower surface of the surrounding part inclining downward toward the through hole, and
the first thickness is half or less of the second thickness, the second thickness is a maximum thickness of the partition portion, and a third thickness that is a thickness of the through hole is less than the second thickness.

2. The animal toilet according to claim 1,
wherein an inclination angle of the surrounding part is between 10° and 50° inclusive.

3. The animal toilet according to claim 2,
wherein the inclination angle of the surrounding part is between 20° and 40° inclusive.

4. The animal toilet according to claim 1,
wherein the first thickness is equal to a minimum thickness of the partition portion.

5. The animal toilet according to claim 1,
wherein an outer diameter of the surrounding part around the through hole is 1.5 times or more of a diameter of the through hole.

6. The animal toilet according to claim 1,
wherein a shape of the through hole and a shape of an outline of the surrounding part are similar to each other in plan view.

7. The animal toilet according to claim 1,
wherein an area of the remaining part is larger than an area of the surrounding part in plan view.

8. The animal toilet according to claim 1,
wherein an entirety of a part of the partition portion other than the through hole has the first or second thickness.

9. The animal toilet according to claim 1,
wherein the partition portion is made of plastic.

10. The animal toilet according to claim 1, further comprising:
a plurality of grains that are disposed on the partition portion and have a water-repellent property.

11. The animal toilet according to claim 10,
wherein an outer diameter of the surrounding part is larger than a particle diameter of one of the plurality of grains that has a minimum particle diameter.

12. The animal toilet according to claim 1,
wherein an upper surface of the surrounding part is continuous with an upper surface of the remaining part.

13. The animal toilet according to claim 1,
wherein an upper surface of the surrounding part is not continuous with an upper surface of the remaining part.

14. The animal toilet according to claim 1,
wherein the partition portion has a plurality of the through holes, the surrounding part and the remaining part provided in between adjacent ones of the through holes.

15. The animal toilet according to claim 14,
wherein the partition portion has the second thickness at a midpoint of adjacent two of the through holes.

16. The animal toilet according to claim 1,
wherein the body portion has a projecting part that is provided so as to project from the side face part toward the inside of the body portion, and
the partition portion is placed on the projecting part.

17. The animal toilet according to claim 1, further comprising:
a water-absorbing sheet that is disposed under the partition portion and absorbs the urine having passed through the through hole.

18. The animal toilet according to claim 17, further comprising:
a drawer portion that houses the water-absorbing sheet,
wherein an opening is formed in the side face part of the body portion, and
the drawer portion is capable of being inserted in and extracted from the body portion through the opening.

19. The animal toilet according to claim 1,
wherein the surrounding part inclines downward directly and entirely abutting the through hole.

* * * * *